(12) United States Patent
Kato et al.

(10) Patent No.: US 7,132,094 B2
(45) Date of Patent: Nov. 7, 2006

(54) METHOD OF PRODUCING HOLLOW ALUMINA PARTICLE

(75) Inventors: Takayuki Kato, Susono (JP);
Tomohiro Taniguchi, Susono (JP);
Makoto Egashira, Nagasaki (JP);
Yasuhiro Shimizu, Nagasaki (JP);
Takeo Hyodo, Nagasaki (JP);
Kazutaka Kamitani, Nagasaki (JP)

(73) Assignee: Yazaki Corporation, Tokyo (JP)

( * ) Notice: Subject to any disclaimer, the term of this patent is extended or adjusted under 35 U.S.C. 154(b) by 263 days.

(21) Appl. No.: 10/826,697

(22) Filed: Apr. 19, 2004

(65) Prior Publication Data

US 2004/0265221 A1   Dec. 30, 2004

(30) Foreign Application Priority Data

Apr. 17, 2003  (JP)  ............... P2003-113122
Sep. 29, 2003  (JP)  ............... P2003-336960
Jan. 23, 2004  (JP)  ............... P2004-015734

(51) Int. Cl.
*B01J 19/10* (2006.01)
*C01F 7/02* (2006.01)
*C01F 7/30* (2006.01)

(52) U.S. Cl. ............... 423/625; 423/111; 204/157.42

(58) Field of Classification Search ............... 423/625, 423/111; 204/157.42
See application file for complete search history.

(56) References Cited

U.S. PATENT DOCUMENTS 1,871,793 A * 8/1932 Horsfield ............... 423/625

6,004,525 A * 12/1999 Tani et al. ............... 423/600

FOREIGN PATENT DOCUMENTS

JP   61-31315 A   * 2/1986
JP   7-267613 A     10/1995

OTHER PUBLICATIONS

Japanese Abstract No. 2003089519, dated Mar. 28, 2003.
T. Kato, et al., "Preparation of Hollow Alumina Microspheres by Ultrasonic Spray Pyrolysis", Journal of the Ceramic Society of Japan, 110[3], 2002, 146-148.
T. Ogihara, et al., "Synthesis and sintering of barium titanate fine powders by ultrasonic spray pyrolysis", Advanced Powder Technology (1999), 10(1), 37-50 as CA.
C.H. Chao, et al., "Ultrasonic spray pyrolysis of a chelated precursor into spherical YBa2Cu3O7-x high temperature superconductor powders", Journal of Materials Science (1995), 30(24), 6136-6144 as CA.

* cited by examiner

*Primary Examiner*—Timothy C. Vanoy
(74) *Attorney, Agent, or Firm*—Sughrue Mion, (57) ABSTRACT

A method of producing hollow alumina particles in which the grain size of hollow alumina particles is controlled and in which a high formation ratio of hollow particles is obtained while suppressing the formation of solid particles. The method includes irradiating supersonic waves to an aqueous solution containing aluminum nitrate or aluminum acetate, and a surfactant or an organic acid to generate micro-liquid droplets in an atomized state, introducing only minute liquid droplets having a certain grain size or less, which have been classified by an air stream, into a furnace and burning them in air.

6 Claims, 9 Drawing Sheets

METHOD OF PRODUCING HOLLOW ALUMINA PARTICLE

BACKGROUND OF THE INVENTION

Field of the Invention

The present invention concerns a method of producing hollow alumina particles and, more in particular, it relates to a producing method capable of controlling the grain size of the hollow alumina particles, and providing high formation ratio of hollow particles while suppressing the formation of solid particles.

For example, with an aim of reducing the weight and enhancing the strength of materials, composite materials in which ceramic particles are dispersed in base materials such as metals have been used generally. Among them, since hollow alumina particles have low heat conductivity and high stability and further have characteristics of low hot load softening temperature, and small hot modulus of elasticity and re-heat shrinkage, they have attracted an attention as functional fillers providing high added values to materials.

As one of methods for producing hollow alumina particles, it has recently been proposed a supersonic atomizing heat decomposing method of applying supersonic waves on an aqueous solution of aluminum nitrate to generate micro-liquid droplets of an aqueous solution of aluminum nitrate in an atomized state, introducing the micro-liquid droplets to a burning furnace and burning them as shown in Unexamined Japanese Patent Publication 7-267613. According to the supersonic atomizing heat decomposing method, since micro-liquid droplets are burned instantaneously, minute follow alumina particles nearly equal with true spheres can be obtained.

However, in the existent supersonic atomizing heat decomposing method, since micro-liquid droplets generated under the effect of supersonic waves are sent as they are to the burning furnace, various hollow alumina particles of different grain sizes are mixed together and this requires an additional classifying operation for making a starting material for composite materials. Further, it also involves a problem that the ratio of forming solid alumina particles is high and the formation ratio of hollow particles is low.

SUMMARY OF THE INVENTION

Accordingly, the present invention intends to provide a method of producing hollow alumina particles capable of controlling the grain size of the hollow alumina particles and providing high formation ratio of hollow particles while suppressing formation of solid particles.

The present inventors have made an earnest study for attaining the foregoing purpose, as a result, found that the ratio of forming the hollow particles can be improved outstandingly by adding a surfactant or an organic acid to an aqueous solution of aluminum nitrate or an aqueous solution of aluminum acetate, and have accomplished the invention.

That is, the present invention provides a method of producing hollow alumina particles shown below in order to attain the foregoing purpose.

According to a first aspect of the present invention, there is provided a method of producing hollow alumina particles comprising the steps of: irradiating supersonic waves to an aqueous solution containing aluminum nitrate or aluminum acetate, and a surfactant or an organic acid, to generate micro-liquid droplets in an atomized state; introducing the generated micro-liquid droplets only for the portion of micro-liquid droplets having a predetermined grain size or less by an air stream and burning them in air.

According to a second aspect of the present invention, a method of producing hollow alumina particles as described in the first aspect above, wherein the concentration of aluminum nitrate or aluminum acetate is from 0.1 to 1.0 M.

According to a third aspect of the present invention, a method of producing hollow alumina particles as described in the first or second aspect described above, wherein 0.0005 to 0.05 mol of the surfactant or 0.03 to 0.5 mol of the organic acid is added to one mol of aluminum nitrate or aluminum acetate.

According to a fourth aspect of the present invention, a method of producing hollow alumina particles according to any one of first to third aspect described above, wherein the organic acid is citric acid, amino acid or maleic acid.

According to a fifth aspect of the present invention, a method of producing hollow alumina particles according to any one of first to fourth aspect described above, wherein the surfactant is an olefinic polymer having a weight average molecular weight of from 2,500 to 6,000.

According to a sixth aspect of the present invention, A method of producing hollow alumina particles according to any one of first to fifth aspect described above, wherein the resultant hollow alumina particles are further re-burned.

According to the invention, hollow alumina particles of uniform grain size can be obtained at an outstandingly higher yield than usual.

DETAILED DESCRIPTION OF PREFERRED EMBODIMENTS

The present invention is to be described specifically for preferred embodiments.

The method of producing hollow alumina particles according to the invention is based on a supersonic spray heat decomposing method. That is, FIG. 1(A) is a schematic constitutional view showing a preferred apparatus for practicing a producing method according to the present invention. At first, supersonic waves are irradiated from a supersonic wave generator 11 to a starting aqueous solution 1 containing aluminum nitrate or aluminum acetate and a surfactant or an organic acid filled in a storage vessel 10 to generate atomized micro-liquid droplets 1a of the starting aqueous solution 1. At the same time, a predetermined amount of air is introduced through an air introduction pipe 12 into the storage vessel 10, thereby rising the generated micro-liquid droplets 1a in the inside of a supply pipe 13 and sending them to a liquid droplet selecting section 14.

In the starting aqueous solution, the concentration of aluminum nitrate or aluminum acetate is preferably from 0.1 to 1.0 M. Further, the content of the surfactant is preferably from 0.0005 to 0.05 mol to one mol of the aqueous solution of aluminum nitrate or aluminum acetate.

Any surfactant may be used with no particular restriction so long as the surfactant can form an aqueous solution together with aluminum nitrate or aluminum acetate. As the molecular weight is larger, the yield of the hollow alumina particles is improved and the addition amount can be decreased. A preferred surfactant is an olefinic polymer having a weight average molecular weight from 2,500 to 6,000 and, more preferably, an olefinic polymer having a weight average molecular weight from 28,000 to 5,000. Specifically, copolymers of ethylene oxide and propylene oxide, having the weight average molecular weight in the range described above, and olefinic acid amide ethoxylate and aliphatic alcohol ethoxylate are suitable.

Among the organic acids, carboxylic acids are preferred and, particularly, citric acid, amino acid and maleic acid are suitable. The organic acids may be used respectively alone or used as an appropriate combination thereof. Further, the content of the organic acid is preferably from 0.03 to 0.05 mol per one mol of the aqueous solution of aluminum nitrate or aluminum acetate. Hollow alumina particles excellent in mechanical strength can be obtained at a high yield by controlling the composition of the starting aqueous solution as described above.

The liquid droplets selecting section 14, as shown by an enlarged scale in FIG. 1(B), has an air introduction pipe 16 inserted horizontally to the center of a main body 15. When a predetermined amount of air is introduced through the air introduction pipe 16 to the main body 15, air flows through the supply pipe 13 to the main body 15 to send suspended file liquid droplets 1a by way of an air stream to a furnace pipe 21 of a burning furnace 20. Accordingly, among the micro-liquid droplets 1b suspending in the inside of the main body, only the micro-liquid droplets 1b suspending above the position for the air introduction pipe 16, that is, those of a certain grain size or smaller are sent to the furnace pipe 21 by air stream.

The furnace pipe 21 is kept at a burning temperature, for example, from 1,200 to 1,300° C., and the micro-liquid droplets 1b are decomposed and burned during passage through the furnace pipe 21 into hollow alumina particles 30 and deposited at the end of the furnace pipe 21. The heat decomposing and burning time in the burning furnace 20 is controlled by the amount of air supplied from the air introduction pipe 16 in the liquid droplet section 14. Further, a gas (NOx) generated upon heat decomposition and burning is cleaned with an appropriate alkali 40 and then recovered.

In the decomposing and burning mechanism described above, as shown schematically in FIG. 2, a micro-liquid droplet 1b of an starting aqueous solution containing molecules 30m of aluminum nitrate or aluminum acetate and a surfactant or an organic acid is at first formed with an outer shell by alumina 30c formed by instantaneous oxidation of the molecules 30m of aluminum nitrate or aluminum acetate present at the outer peripheral portion thereof. Simultaneously, a gel 30b containing the molecules 30m of aluminum nitrate or aluminum acetate, and the surfactant or the organic acid is formed inside the outer shell. In the gel 30b, molecules 30m of aluminum nitrate or aluminum acetate are not agglomerated to each other by the effect of the surfactant or the organic acid but are dispersed each at an appropriate distance. However, in the existent method, since the surfactant or the organic acid is not contained. The molecules 30m of aluminum nitrate or aluminum acetate are agglomerated to each other tending to form solid alumina particles.

Figure 2:
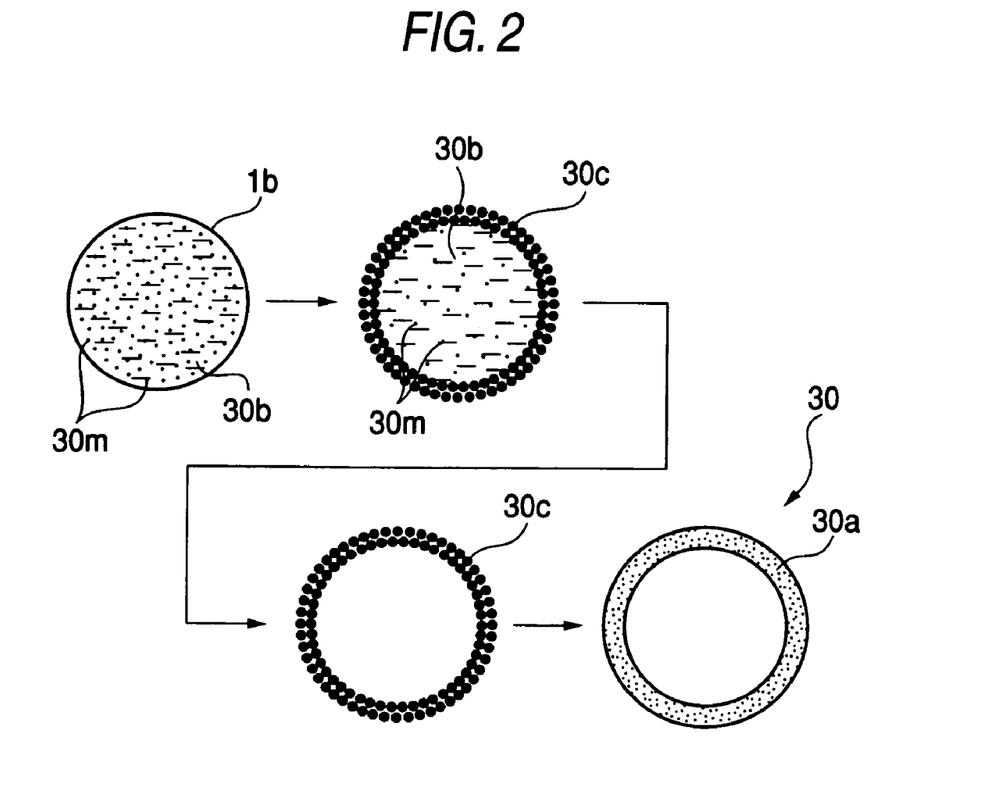
FIG. 2 is a schematic view for explaining a mechanism of forming hollow alumina particles in the method according to the invention.

Then, the gel 30b releases incorporated water content and the molecules 30m of aluminum nitrate or aluminum acetate move outward along the release of water, during which aluminum ions are oxidized to form alumina 30c, the thus formed alumina 30c is successively deposited on the inner wall of the outer shell. The outer shell grows to a large wall thickness and, finally, forms a hollow alumina particle 30 comprising the outer shell 30a. Also in this case, since the molecules 30m of aluminum nitrate or aluminum acetate are not agglomerated to each other by the effect of the surfactant or the organic acid, and alumina 30c is uniformly deposited to each of the portions on the inner wall of the outer shell, the outer shell has a uniform thickness and is excellent in view of the strength.

As described above, by the method according to the invention, hollow alumina particles within a certain grain size range can be obtained easily at a high yield.

In the hollow alumina particles obtained by the heat decomposition and burning described above, δ-alumina or γ-alumina is predominant. Then, it is preferred to convert the same into stable α-alumina by re-burning at 1,300° C. for about 1 to 2 hours.

The present invention is to be described more specifically with reference to examples but the invention is no way restricted to them.

EXAMPLE 1

Figure 1:
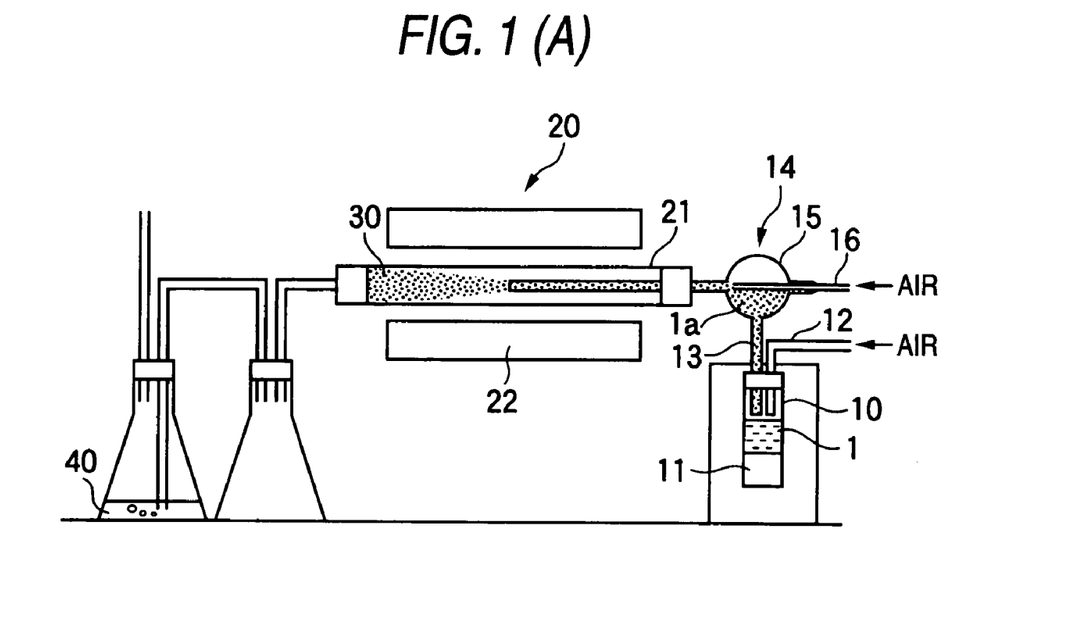
FIG. 1(A) is a schematic constitutional view showing a preferred apparatus for practicing a producing method according to the present invention.
FIG. 1(B) is an enlarged view for liquid droplet selecting section.

Starting aqueous solution was prepared by adding a copolymer of ethylene oxide and propylene oxide (weight average molecular weight 2,900) as a surfactant so as to be 0.05 mol based on aluminum nitrate to an aqueous 0.5 M solution of aluminum nitrate. Then, hollow alumina particles were manufactured under the following processing conditions by using the producing apparatus shown in FIG. 1.

Amount of air supply to air introduction pipe: 500 mL/min

Amount of air supply to air introduction pipe: 100 mL/min

Temperature of burning furnace: 1300° C.

Heat decomposition and burning time: 0.032 min.

When the obtained powder was taken out and subjected to X-ray diffractiometry, it was confirmed that the powder was δ-alumina. Then, the powder was re-burned at 1300° C. for one hour. When the re-burned powder was subjected to X-ray diffractiometry, it was confirmed to be α-alumina.

Figure 3:
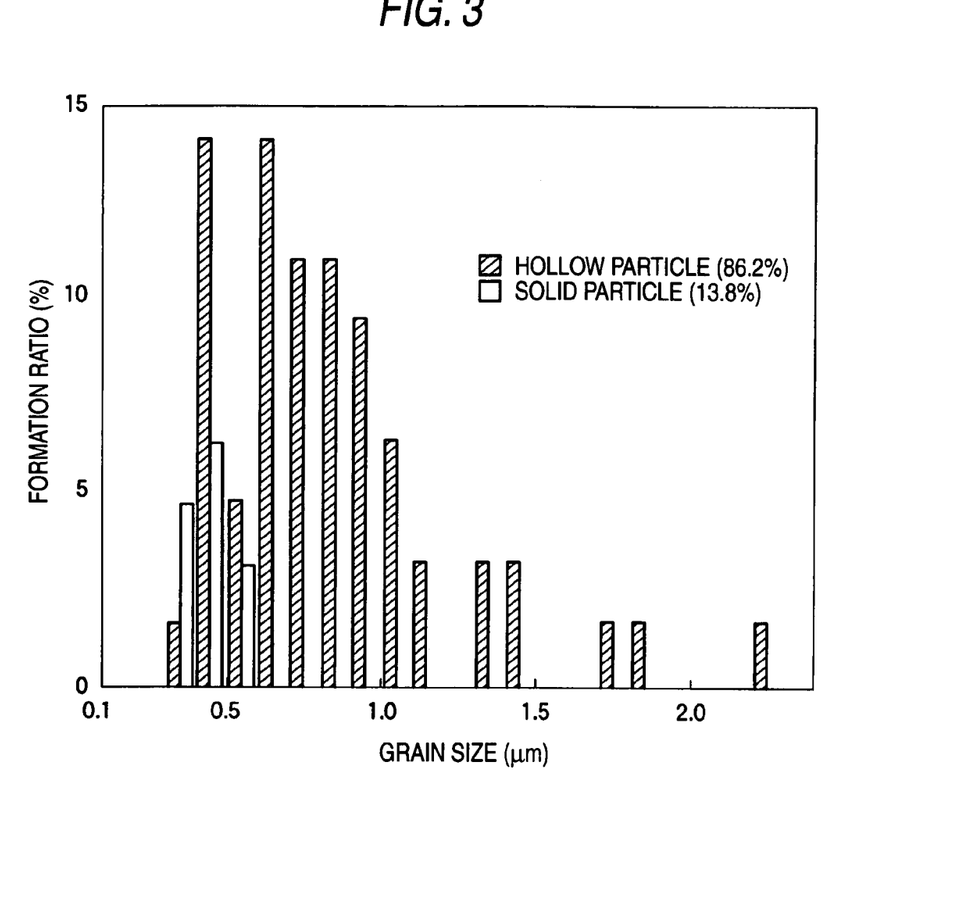
FIG. 3 is a graph showing the grain size distribution for a powder after re-burning obtained in Example 1.

Further, the grain size distribution of the powder after re-burning was determined and the result shown in FIG. 3. As apparent from FIG. 3, while solid particles were formed in a partial range for small grain size, hollow alumina particles were obtained as a whole at a high yield (86.2%).

EXAMPLE 2

Figure 4:
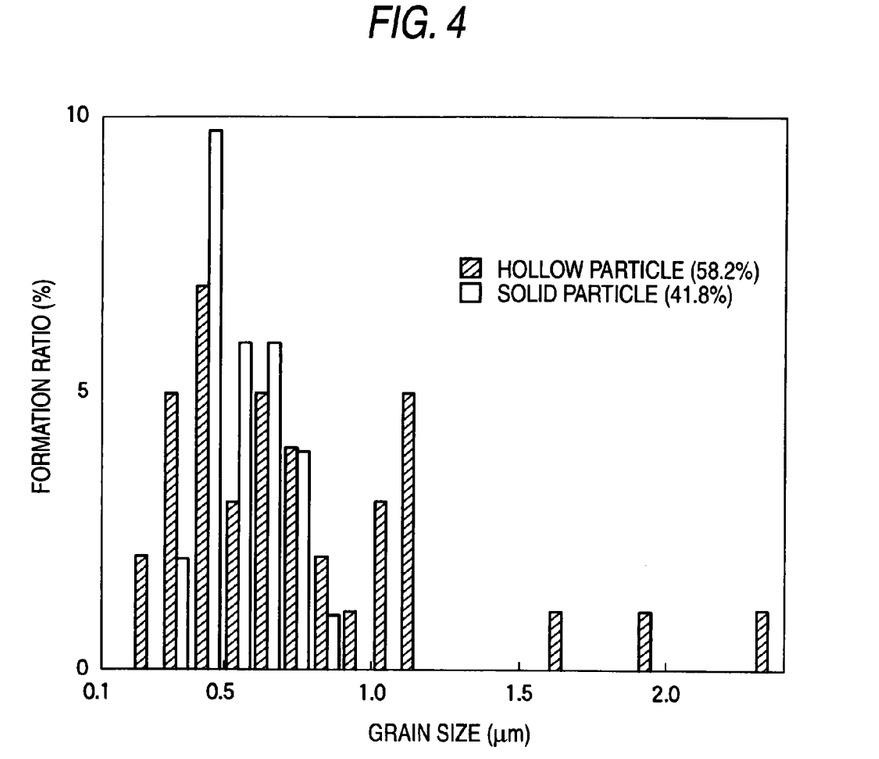
FIG. 4 is a graph showing the grain size distribution for a powder after re-burning obtained in Example 2.

Except for changing the addition amount of the copolymer of ethylene oxide and propylene oxide to 0.0005 mol, processing was conducted under the same conditions as those in Example 1 and the obtained powder was re-burned. When the grain size distribution of the powder after re-burning was determined, while solid particles were formed in a partial range for small grain size were formed, hollow alumina particles were obtained as a whole at high yield (58.2%) as shown in FIG. 4.

EXAMPLE 3

Figure 5:
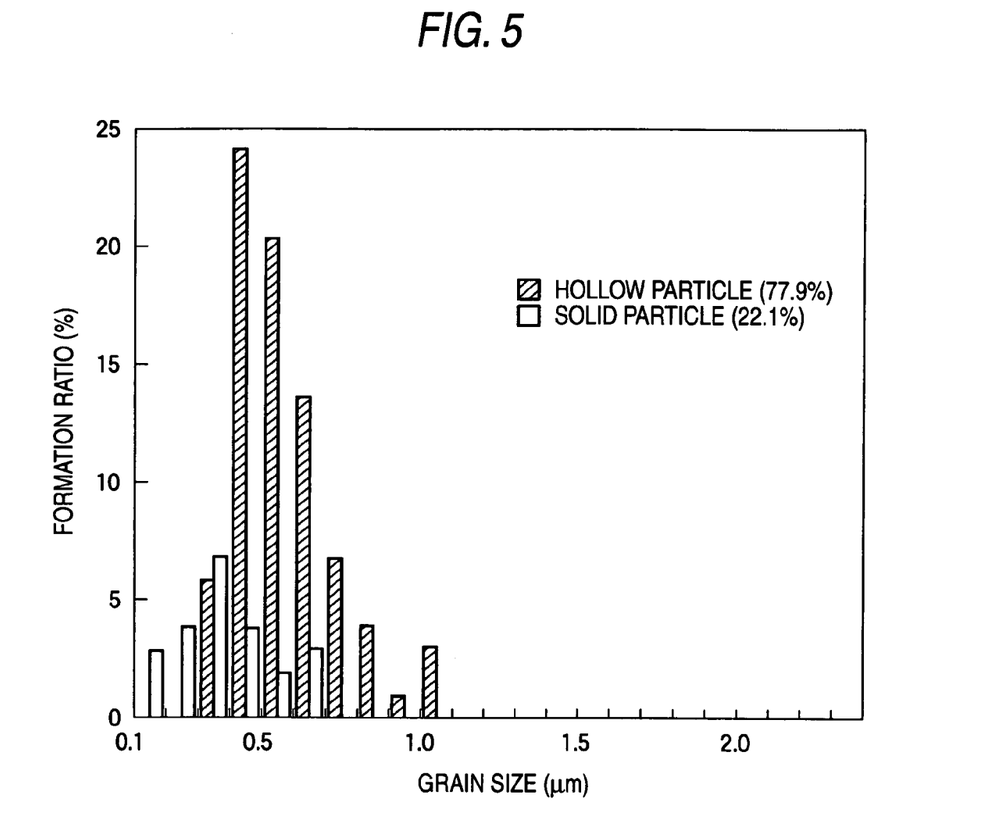
FIG. 5 is a graph showing the grain size distribution for a powder after re-burning obtained in Example 3.

Processing was conducted under the same conditions as those in Example except for using 0.045 mol of citric acid instead of the surfactant and the obtained powder was re-burned. When the grain size distribution of the powder after re-burning was determined, while solid particles were formed in a partial range for small grain size were formed as shown in FIG. 5, hollow alumina particles were obtained as a whole at high yield (77.9%) as shown in FIG. 5.

Comparative Example 1

Figure 6:
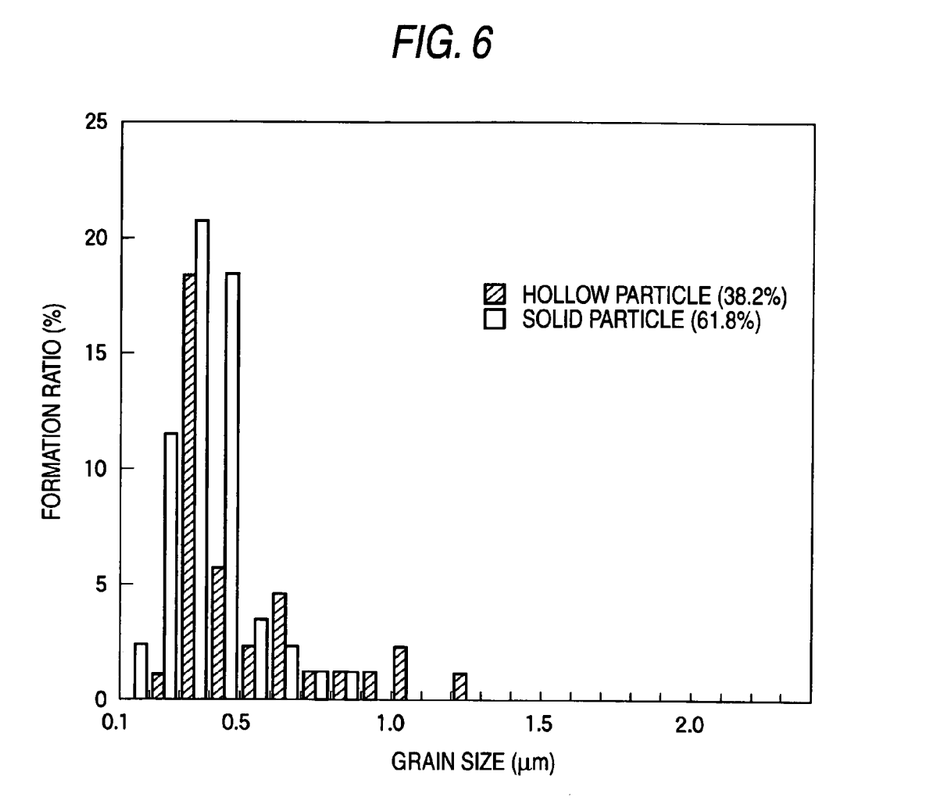
FIG. 6 is a graph showing the grain size distribution for a powder after re-burning obtained in Comparative Example 1.

Processing was conducted under the same conditions as those in Example 1 without adding the surfactant and using only the aqueous 0.5 M solution of aluminum nitrate and the obtained powder was re-burned. The grain size distribution for the powder after re-burning was determined. The result is shown in FIG. 6. It can be seen that the ratio of forming solid particles (61.8%) is greater than that of hollow particles (38.2%).

Comparative Example 2

Figure 7:
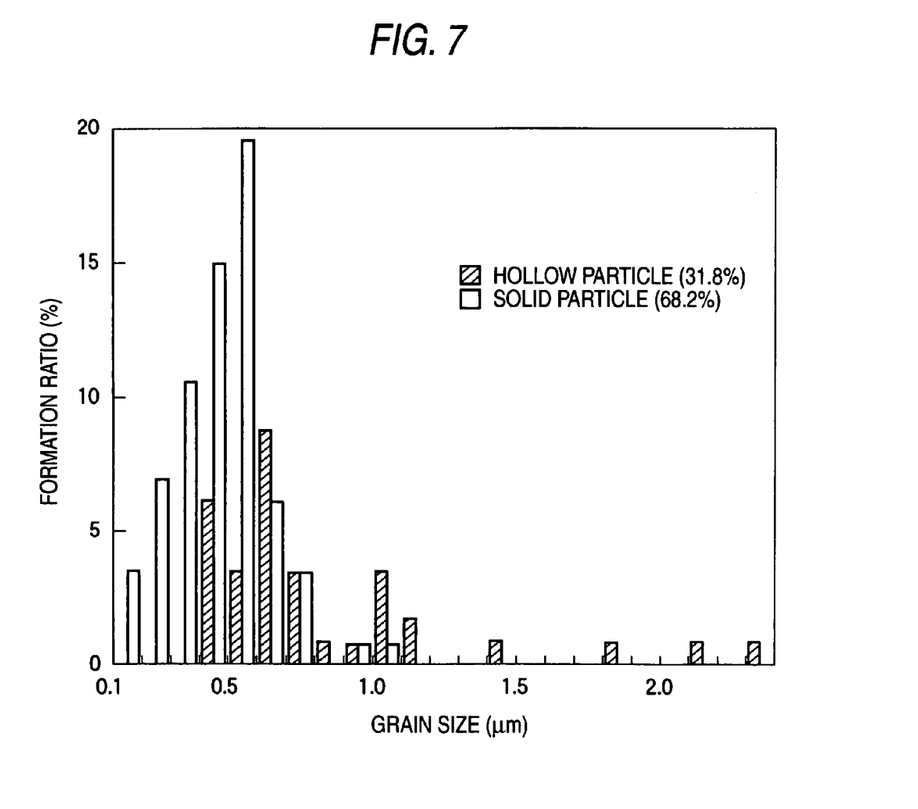
FIG. 7 is a graph showing the grain size distribution for a powder after re-burning obtained in Comparative Example 2.

Processing was conducted under the same conditions as those in Example 1 except for changing the content of citric acid to 0.025 mol, and the obtained powder was re-burned. When the grain size distribution for the powder after re-burning was determined, it can be seen that the ratio of forming solid particles (68.2%) is greater than that of hollow particles (31.8%) as shown in FIG. 7.

EXAMPLE 4

Figure 8:
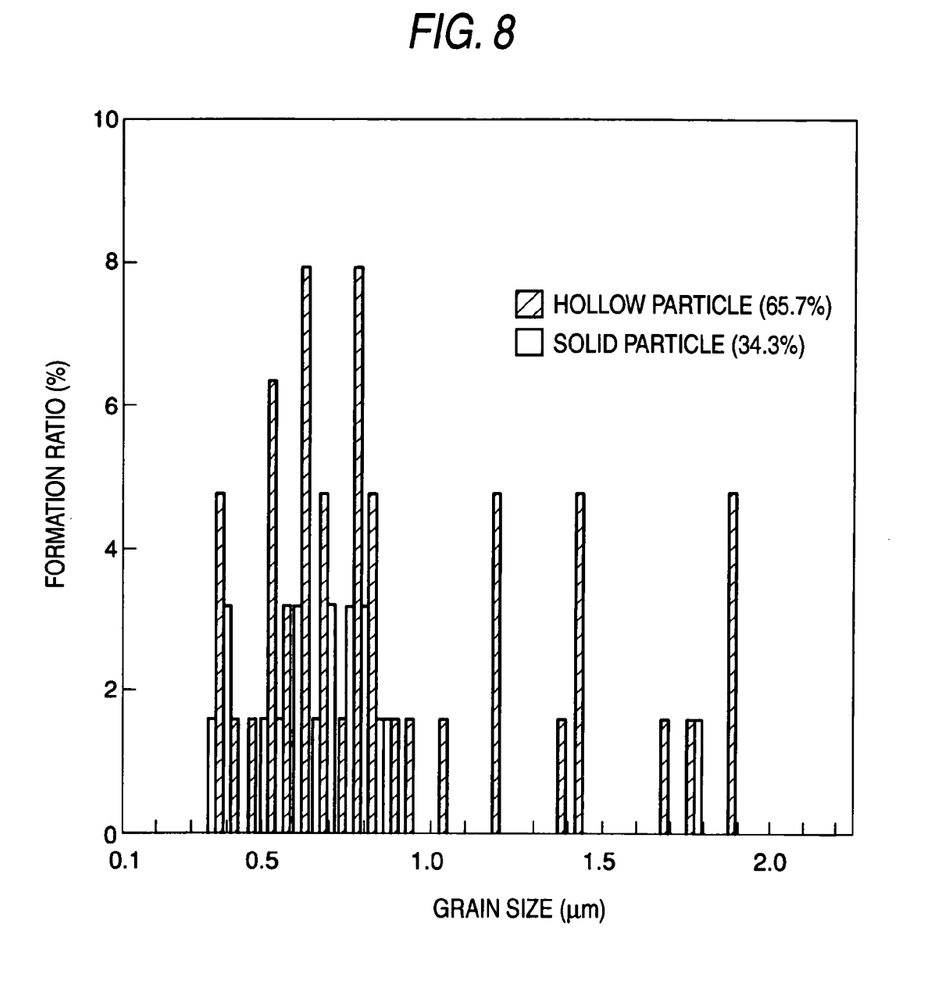
FIG. 8 is a graph showing the grain size distribution for a powder after re-burning obtained in Example 4.

Processing was conducted under the same conditions as those in Example 1 except for adding the copolymer of ethylene oxide of a weight average molecular weight of 2,900 and propylene oxide so as to be 0.0008 mol based on aluminum nitrate, and the obtained powder was re-burned. When the grain size distribution of the powder after re-burning was determined, while solid particles were formed in a partial range for small grain size, hollow alumina particles were obtained at a high yield (65.7%) as shown in FIG. 8.

EXAMPLE 5

Figure 9:
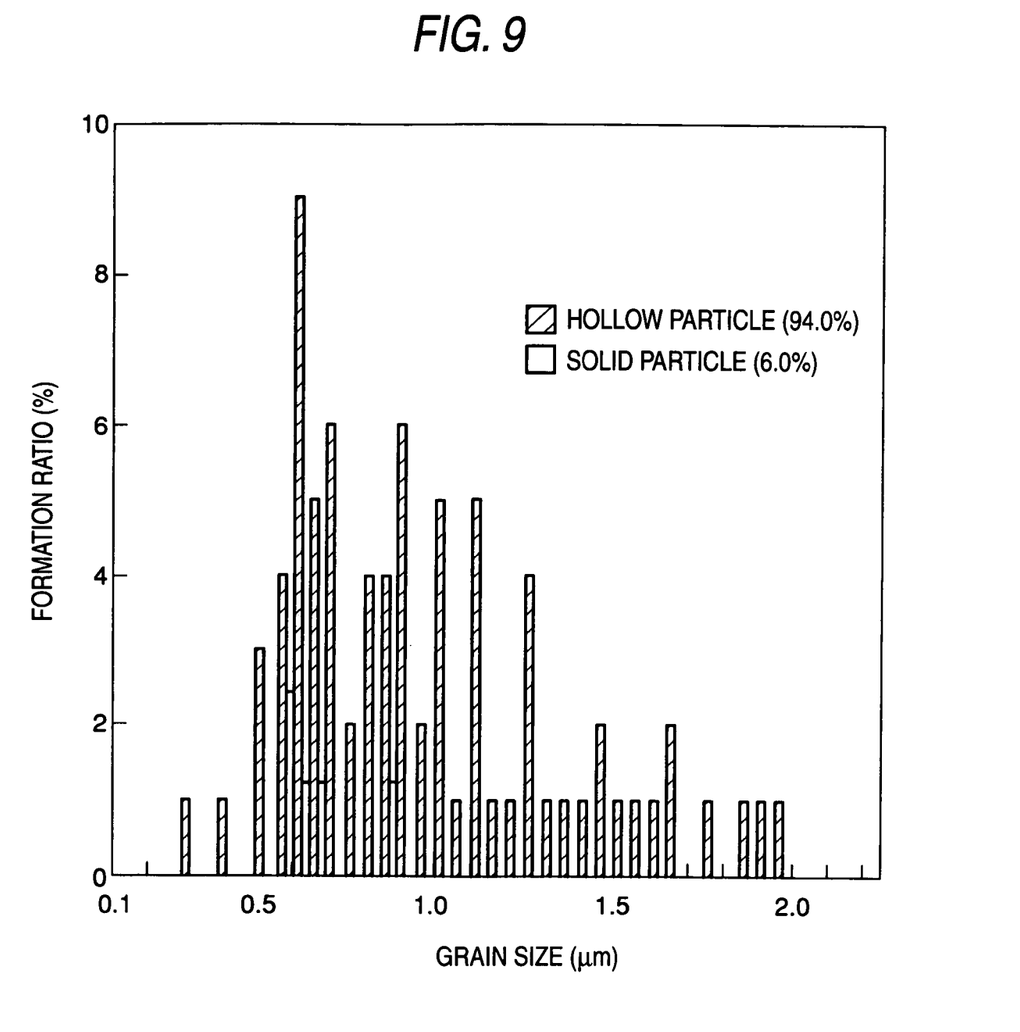
FIG. 9 is a graph showing the grain size distribution for a powder after re-burning obtained in Example 5.

Processing was conducted under same the conditions as those in Example 1 except for adding the copolymer of ethylene oxide of a weight average molecular weight of 4,600 and propylene oxide so as to be 0.0008 mol based on aluminum nitrate, and the obtained powder was re-burned. When the grain size distribution of the powder after re-burning was determined, while solid particles were formed in a partial range for small grain size, hollow alumina particles were obtained at a high yield (94.0%) as shown in FIG. 9.

It can be seen from the comparison between Example 4 and Example 5, the yield of the hollow particles is improved even for an identical addition amount as the molecular weight of the surfactant increases.

What is claimed is:

1. A method of producing hollow alumina particles comprising the steps of:
   generating micro-liquid droplets in an atomized state from an aqueous solution containing one of aluminum nitrate and aluminum acetate and one of a surfactant and an organic acid by irradiating the aqueous solution with supersonic waves;
   selecting the generated micro-liquid droplets having a predetermined grain size or less by classification with an air stream;
   introducing the selected micro-liquid droplets into the furnace; and
   burning the selected micro-liquid droplets in air.

2. A method of producing hollow alumina particles according to claim 1, wherein the concentration of aluminum nitrate or aluminum acetate is from 0.1 to 1.0 M.

3. A method of producing hollow alumina particles according to claim 1, wherein one of 0.0005 to 0.05 mol of the surfactant and 0.03 to 0.5 mol of the organic acid is added to one mol of one of aluminum nitrate and aluminum acetate.

4. A method of producing hollow alumina particles according to claim 1, wherein the organic acid corresponds to one of citric acid, amino acid and maleic acid.

5. A method of producing hollow alumina particles according to claim 1, wherein the surfactant corresponds to an olefinic polymer having a weight average molecular weight of from 2,500 to 6,000.

6. A method of producing hollow alumina particles according to claim 1, wherein the resultant hollow alumina particles are further re-burned.

* * * * *